July 5, 1966  F. E. LORD  3,259,900
DROPPABLE ANTENNA
Filed Jan. 4, 1963
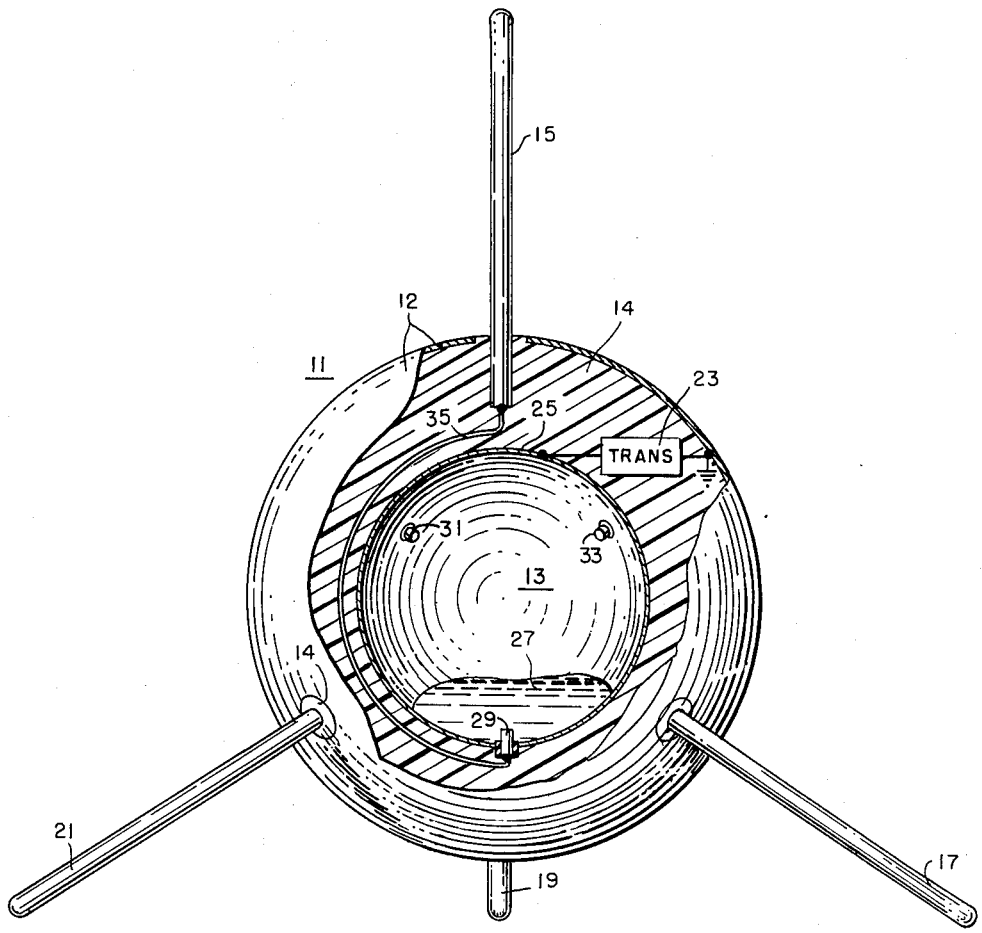
INVENTOR,
FRANK E. LORD
BY *Harry M. Saragovitz*
ATTORNEY.

United States Patent Office 3,259,900
Patented July 5, 1966

3,259,900
DROPPABLE ANTENNA
Frank E. Lord, San Carlos, Calif., assignor to the United States of America as represented by the Secretary of the Army
Filed Jan. 4, 1963, Ser. No. 249,543
5 Claims. (Cl. 343—705)

The present invention relates to an antenna. Specifically the invention is concerned with a droppable device which serves as an antenna, which is capable of carrying electrical and electronic equipment and which can be dropped to the surface of the earth or other satellite body in space, such as the moon. The general purpose of the antenna device of the invention is to transmit and/or receive sound or electromagnetic radiations. For the most effective operation of transmitting and receiving equipment it is generally thought that most effective utilization can be accomplished when the transmitting and/or receiving elements are elevated over the remainder of the equipment and the surrounding terrtain where the equipment is finally positioned.

The primary object of this invention to provide a droppable antenna package that can carry electrical and electronic equipment which assumes a stable attitude upon landing on the surface of the earth or any other terrain.

Another object of the invention is to provide a droppable antenna package wherein any one of a plurality of transmitting and/or receiving elements will be established in an operating condition in an uppermost position relative to the remainder of the device and the terrain where the package is dropped or landed.

An important feature of the invention resides in the use of a switch of unique design and function, whereby there is established a transmitting and/or receiving element in an attitude that is uppermost with respect to the remainder of the device that carries it and to the surrounding terrain.

Heretofore various techniques and devices have been utilized to establish and maintain a receiving and transmitting element of an equipment such as a radio, in the uppermost position relative to the equipment and the surrounding terrain. One such method was by dropping the package containing the device in a particular manner initially so that it would land with the desired element in a desired oriented position. Other means included the use of involved mechanisms to erect a specific element to an upright elevated position after the package has landed in some random position. The means and methods utilized for elevating and maintaining an antenna element, such as described immediately above, are generally complex and in many instances unreliable. It has been found that when such packaged devices land in trees or brush, they generally may not perform their assigned function, since proper operation of the device depends upon their striking a solid mass, such as the ground, in the proper attitude. Since the device which launches the package or the package itself involves many parts and components to perform the desired function of establishing an antenna element in the uppermost position, the possibility exists of malfunctioning of any one of the many component parts thereby making performance unreliable.

The present invention seeks to overcome most of the deficiencies of the prior devices by providing a droppable package including an antenna having four transmitting and/or receiving elements so positioned and disposed that one of the elements will be in an uppermost position with respect to the remainder of the device irrespective of the manner in which the package lands, and further including a uniquely operated switch which activates and sets into operation the transmission or receiving of signals from or to the antenna element in the uppermost position after the package lands on a remote terrain.

The invention can best be understood from the following description to be read in view of the accompanying drawing in which the single figure is a view in perspective, and partly broken away, of one embodiment of a droppable antenna package in its erected operative position.

The droppable package comprises essentially a housing generally designated as 11 in the form of a globe, a switching device 13, contained within the housing 11, in the form of a hollow sphere of an electrically conductive material and four antenna elements designated respectively 15, 17, 19, and 21. The housing 11 includes an outer surface 12 of an electrically conductive material and an inner lining 14 of a lightweight material such as a plastic foam or the like. It is to be noted that the antenna elements are electrically insulated from the outer surface 12 of the housing 11.

The globe 11 has also confined therein a transmitter 23 which is one example of any desired form or type of electronic equipment that may be utilized in conjunction with the remainder of the package dependent upon the specific objectives of the equipment. The antenna elements 15, 17, 19 and 21 serve a dual function, first as discrete transmitting or receiving means such as shown in the drawing when element 15 so functions, and secondly as support legs for the device when it lands, such function being performed by elements 17, 19 and 21 as shown in the specific embodiment of the drawing.

The location and orientation of the antenna elements, which also serve as supporting legs, is of prime importance in assuring that the package when landed will assume any one of four positions when it comes to rest. In each instance, the package will be resting on three elements functioning as its legs and the fourth element will be vertical or substantially so, serving as a receiving or transmitting antenna. In locating and positioning the elements 15–21, it is believed that the description thereof can best be understood by considering locating the several antenna elements 15–21 in relation to a tetrahedron and an inscribed or circumscribed sphere In such light, one of the elements is positioned at an apex, or one of the points of the tetrahedron. The remaining three elements are each positioned to extend from the discrete points of the tetrahedron in such manner that each of the elements if extended would terminate substantially at the median of the plane or surface opposite to any one of said points from which any one of said elements is extended. If viewed in light of a sphere such as housing 11 herein, the element 15 can be considered as located and extending from the North Pole, the element 17 at prime meridian at south latitude of about 19½°, and the elements 19 and 21 at 120° and 240° longitude respectively and at the same south latitude of about 19½° as element 17. Thus the south latitude positions will be 109½° from the North Pole and it can be shown that they are also 109½° from each other since in equilateral spherical triangles of corner angles $A=120°$, the side arcs $a$ would equal 109° 28¼' since $$\cos a = \frac{\cos A + \cos^2 A}{\sin^2 A} = -\frac{1}{3}$$

It will be, of course, understood that in all instances the antenna elements 15–21 are of the same length and will extend a uniform length outwardly from the housing 11. By the positioning and orientation of the separate antenna elements in the manner described immediately above there will be provided an arrangement whereby the four elements 15–21 are mutually substantially equally spaced. It will thus be apparent that from such orientation of the elements 15–21 within and extending from the housing 11 that when the device is dropped from a moving vehicle, such as an airplane, the device will assume a position of resting on three of the elements and the fourth will be in a substantially upright and vertical position.

As heretofore indicated the droppable antenna includes the switch 13 which serves to initiate the operation of the device. The switch 13 comprises a hollow sphere 25 of electrically conductive material. Confined within the sphere is a pool of an electrically conductive fluid 27, such as mercury. Extending into and through the surface of the sphere 25 are four pairs of electrodes, three such pairs being shown as 29, 31 and 33. The four pairs of electrodes, which are electrically insulated from the sphere 25, are so positioned in the sphere 25 so as to be substantially equidistant from one another and so oriented that each pair of electrodes is substantially diametrically opposite to one of the four discrete antenna elements. For example as shown in the drawing the electrodes 29 are opposite to element 15 and electrodes 31 are opposite to element 17. Between each of the electrodes and its opposing antenna element there is provided a lead, one of which is shown at 35. In the specific embodiment herein, lead 35 extends between antenna element 15 and one of the electrodes 29 and is positioned outside of the sphere 25 but within the housing 11.

The operation of the droppable antenna herein described can be readily understood from an inspection of the drawing. In the view depicted, the device has landed at a remote area with the antenna elements 17, 19 and 21 serving as supporting legs and the antenna element 15 in an upright position. The liquid mercury being acted upon by gravity comes to rest in the base or lowest part of the sphere 25. With the transmitter 23 in operation, signals will be carried along the sphere 25 to the conducting fluid 27, the electrodes 29 and to the antenna element 15. As heretofore pointed out, any switch that is lowermost operates the antenna element that is uppermost.

While there has been herein described one specific embodiment of the invention, it is obvious that modifications and changes from such embodiment can be made without departing from the spirit and scope of the invention as defined in the claims. Thus, for example, while the device herein includes four antenna elements, it is obvious that a construction using more antenna elements can be made. In such event the greater number of antenna elements will have to be oriented in symmetry and the appropriate number of switches provided. It is also contemplated that suitable springs or similar devices can be incorporated to provide for shock absorption upon landing. If compactness for stowage or shipment is required the antenna elements may be of a folding or telescopic design.

An important modification may be made in the use of a housing of a shape different from the globe-like housing 11 shown herein. Such housing can be of a shape, such as a tetrahedron, that will permit the array of a number of antenna elements about said body in a mutually substantially equally spaced relationship.

It will be understood that the switch 13 is not shown to scale and is actually small compared to the entire antenna package so as not to present an undesirably long electrical path for RF energy. In cases where the nature of the RF path is critical, the RF energy may be routed through more compatible devices such as coaxial relays which would be actuated by the switch.

What is claimed is:

1. An antenna assembly including a housing substantially in the form of a hollow globe and four antenna elements of equal length spaced in a geometric pattern wherein the first of said elements is in a vertical position extending from any point of the surface of the sphere and the remaining three elements are spaced about 109½° from the said first element and passing through the same parallel degree of latitude and a switching means within said housing comprising a hollow sphere having four pairs of electrodes that are mutually equally spaced from each other and wherein each of said pairs of electrodes are opposite to a discrete antenna element, a pool of electrically conductive fluid in said sphere and discrete electrical leads between each of the pairs of electrodes and its discrete opposite antenna element.

2. An antenna assembly including a housing substantially in the form of a hollow globe having an electrically conductive outer shell, four antenna elements extending from said housing that are mutually substantially equally spaced from each other and a switching means within said housing comprising a hollow sphere having four pairs of electrodes that are mutually equally spaced from each other and wherein each of said pairs of electrodes are opposite to a discrete antenna element, a pool of electrically conductive fluid in said sphere and discrete electrical leads between each of the pairs of electrodes and its discrete opposite antenna element.

3. An antenna assembly of the kind set forth in claim 2 wherein said antenna elements are electrically insulated from said housing.

4. An antenna assembly of the kind set forth in claim 2 wherein said electrodes are electrically insulated from said sphere.

5. A switch comprising a hollow spherical body of electrically conductive material having a plurality of electrodes partly within and extending from said sphere that are mutually substantially equally spaced apart and a pool of electrically conductive fluid within said body in such amount whereby when said body is at rest only one of said electrodes will be covered by said pool of fluid.

References Cited by the Examiner

UNITED STATES PATENTS 2,668,239   2/1954   Jipp _____ 343—793

OTHER REFERENCES

Grasshopper, Electrical Engineering, September 1958, pages 857 and 858 relied upon.

HERMAN KARL SAALBACH, *Primary Examiner.*

W. K. TAYLOR, E. LIEBERMAN, *Assistant Examiners.*